United States Patent [19]

Nakashima et al.

[11] Patent Number: 4,575,666
[45] Date of Patent: Mar. 11, 1986

[54] ABSOLUTE POSITION DETECTING SYSTEM FOR SERVOCONTROL SYSTEM

[75] Inventors: Seiichiro Nakashima; Kenichi Toyoda, both of Hino; Shinsuke Sakakibara, Komae, all of Japan

[73] Assignee: Fanuc Ltd., Minamitsuru, Japan

[21] Appl. No.: 688,049
[22] PCT Filed: Apr. 11, 1984
[86] PCT No.: PCT/JP84/00185
  § 371 Date: Dec. 11, 1984
  § 102(e) Date: Dec. 11, 1984
[87] PCT Pub. No.: WO84/04162
  PCT Pub. Date: Oct. 25, 1984

[30] Foreign Application Priority Data

Apr. 11, 1983 [JP] Japan .................. 58-63333

[51] Int. Cl.$^4$ ................................. G05B 1/06
[52] U.S. Cl. .................................. 318/661; 318/602
[58] Field of Search .............. 318/661, 602, 567

[56] References Cited

U.S. PATENT DOCUMENTS 3,904,944  9/1975  Carrick et al. ............. 318/661 X
4,023,085  5/1977  Bishop et al. .............. 318/661 X
4,529,922  7/1985  Ono .............................. 318/661 X Primary Examiner—B. Dobeck
Attorney, Agent, or Firm—Staas & Halsey

[57] ABSTRACT

In an absolute position detecting system for a servocontrol system operatively controlled according to a numerical control program or the like, the absolute position of an operating shaft is detected with a high accuracy based on outputs of a resolver 106 and an absolute encoder 110. The resolver 106 and absolute encoder 110 rotate with a servomotor 105 at a prescribed revolution ratio, so that variations in the absolute position of the operating shaft at the time of a malfunction in the servocontrol system can be stabilized quickly.

4 Claims, 5 Drawing Figures

ABSOLUTE POSITION DETECTING SYSTEM FOR SERVOCONTROL SYSTEM

BACKGROUND OF THE INVENTION

The present invention relates to a system for detecting the absolute position of an operating shaft by way of servocontrol of a servomotor, and more particularly to an absolute position detecting system for a servocontrol system, for detecting the absolute position of an operating shaft based on a detected output produced on rotation at a preset r.p.m. ratio of a resolver and an absolute encoder which rotate with a servomotor.

Servomotors are widely used for positioning a movable portion of an industrial robot or the like with a high accuracy, the servomotors being subjected to servocontrol.

FIG. 1 is a block diagram for explaining such servocontrol, showing an example in which the operating shaft of an industrial robot or the like is positionally controlled by an NC (numerical control) apparatus. Designated in FIG. 1 at 101 is a paper tape punched with NC command data such as positioning information for machining, M, S, T function information, etc., and 102 an NC apparatus for enabling a tape reader, described later, to read NC data from the paper tape 101, encoding the read NC data, feeding M, S, T function commands, etc. to the machine through a driver, not shown, and feeding a movement command Zc to a following pulse distributor. The NC apparatus 102 is composed of a processor 102a for effecting arithmetic operations according to a control program, a program memory 102b for storing the control program, a data memory 102c for storing data, an operator's console 102d for effecting control, a tape reader/puncher 102e, a display unit 102f, an input/output port 102g, a current position counter 102h, and an address/data bus 102 interconnecting the above components.

Denoted at 103 is a pulse distributor for effecting a known pulse distributing arithmetic operation based on the movement command Zc, to generate distributed pulses Ps having a frequency dependent on a command speed. A known acceleration and deceleration circuit 104 produces a pulse train Pi by rectilinearly increasing the pulse rate of the distributed pulse train Ps at the time it is generated, and by rectilinearly reducing the pulse trai at the time it is ended. A motor 105 drives an operating shaft, and a pulse coder 106 generates one feedback pulse FP each time the motor 105 rotates through a prescribed interval an error calculating and storing unit 107 is composed of a reversible counter for storing the difference Er between the number of input pulses Pi generated by the acceleration and deceleration circuit 104 and the number of feedback pulses FP. The error calculating and storing unit 107 comprises, as shown, an arithmetic circuit 107a for calculating the difference Er between Pi and FP, and an error register 107b for storing Er. More specifically, in the event that the motor 105 is commanded to rotate and hence is rotating in a normal direction, the error calculating and storing unit 107 counts up the pulse Pi each time it is generated, counts down the feedback pulse FP each time it is generated, and stores the difference Er between the number of the input pulses and the number of the feedback pulse in the error register 107b. 108 denotes a digital-to-analog (DA) converter for generating an analog voltage in proportion to the content of the error register 107b, and 109 denotes a speed control circuit. The error calculating and storing unit 107 and the DA converter 108 constitute a motor position control circuit.

Operation of the conventional apparatus shown in FIG. 1 will be described.

Prior to machining, the NC data on the paper tape 101 is read by the tape reader/puncher 102e and stored through the bus 102j in the data memory 102c. A start command is applied, via the bus 102j, to the processor 102a in response to operation of the operator's console 102d. Then, the operator's console 102d is operated upon to successively read the machining control program out of the program memory 102b and execute the machining control program. More specifically, the NC data is read from the data memory 102c and at the same time necessary parameters (NC parameter, feed speed, machining voltage, etc.) are read to produce an X-axis movement command Xc and a Y-axis movement command Yc for moving a table (not shown) in X and Y directions, the commands being fed through the input-/output port 102g to a table driver (not shown) for positioning the table. Although not shown in FIG. 1, the arrangement present in the route from the input-/output port 102g to the servomotor 105 is also provided for an X-axis and a Y-axis. Likewise, a Z-axis movement command Zc is produced, and M, S, T function commands are delivered through the input/output port 102g to the machine. The movement command Zc is issued through the bus 102j to the input/output port 102g. When the movement command is applied from the input/output port 102g to the pulse distributor 103, the pulse distributor 103 effects a pulse distributing arithmetic operation based on the movement command Zc to issue distributed pulses Ps, which are applied to the acceleration and deceleration circuit 104 to increase or reduce the pulse rate for supplying a command pulse train Pi to the error calculating and storing unit 107. Since the content of the error register 107b is no longer zero, a voltage is supplied from the DA converter 108 to enable the speed control circuit 109 to drive the motor 105 for driving the operating shaft. Upon rotation of the motor 105 through a prescribed interval, feedback pulse FP are generated by the pulse coder 106 and applied to the error calculating and storing unit 107, and the error register 107b now stores the difference Er between the number of command pulses Pi and the number of feedback pulses FP. The motor 105 is then subjected to servocontrol so as to bring the error Er to zero for driving the operating shaft to a target position.

In servo positioning, as described above, the current position is determined by the counter 102h by employing the feedback pulses FP from the pulse coder 106, which are also utilized for positional control. The pulse coder 106 has a high resolving accuracy and is capable of highly accurate positional control. Therefore, this pulse coder is better than other detectors, such as a resolver, as a detector for positional control.

However, since the pulse coder 106 has no absolute position detecting function, it will be necessary to effect an origin-return operation when the absolute position of the operating shaft is lost (as when the servo system malfunctions or a power supply is switched on). The origin-return operation requires a complex mode of control and is time-consuming. Therefore, there is a need for a new system for detecting an absolute position without effecting the origin-return operation.

There are known an absolute encoder and a resolver as a positional detector capable of detecting an absolute position. The absolute encoder serves to issue an absolute position corresponding to a rotational angle of the operating shaft. The resolver has, as shown in FIG. 2, a rotor 202a, a rotor winding 202b, two stator windings 202c, 202d positioned 90° out of phase with each other, and carrier generator circuits 202e, 202f for generating carriers of sin ωt, sin ωt, respectively. If the rotor 202a is in the position of an angle θ, then the rotor winding 202b develops a voltage e expressed as follows:

$$e = \sin(\omega t + \theta) \quad (1)$$

The relationship between the carrier sin ωt and the output e from the resolver 202 is illustrated in FIG. 3. The absolute position can be determined by finding the phase differences $\theta_1 \sim \theta_n$ with the carrier sin ωt.

Where such a positional detector which is capable of detecting an absolute position, is employed in the servo system, the full stroke of the movable portion to be detected positionally is generally achieved by n (100, for example) revolutions of the motor. Therefore, the resolution is 1/n with respect to one revolution of the motor, resulting in the failure to achieve a sufficient positional accuracy. No increased positional control accuracy can be accomplished unless the accuracy of detecting the absolute position is compatible with a high resolution of the pulse coder.

SUMMARY OF THE INVENTION

It is an object of the present invention to provide an absolute position detecting system for a servo system, capable of detecting the absolute position of an operating shaft with a high accuracy in such a servocontrol system.

According to the present invention, there is provided an absolute position detecting system for a servocontrol system for controlling, under servocontrol, a servomotor for driving an operating shaft, wherein a resolver for detecting a rotational position upon rotation of the servomotor, and an absolute encoder are arranged to rotate at a ratio of 1:m, and wherein a position detected by the resolver is converted into a unit grid value of the absolute encoder to detect an absolute position based on a detected output of the absolute encoder and the converted unit grid value.

With the present invention, therefore, rough positional detection is carried out by the resolver to determine the grid position of the absolute encoder, and accurate positional detection is effected by the absolute encoder for detecting the absolute position.

DESCRIPTION OF THE PREFERRED EMBODIMENTS

The present invention will be described in greater detail with reference to the drawings.

Figure 1:
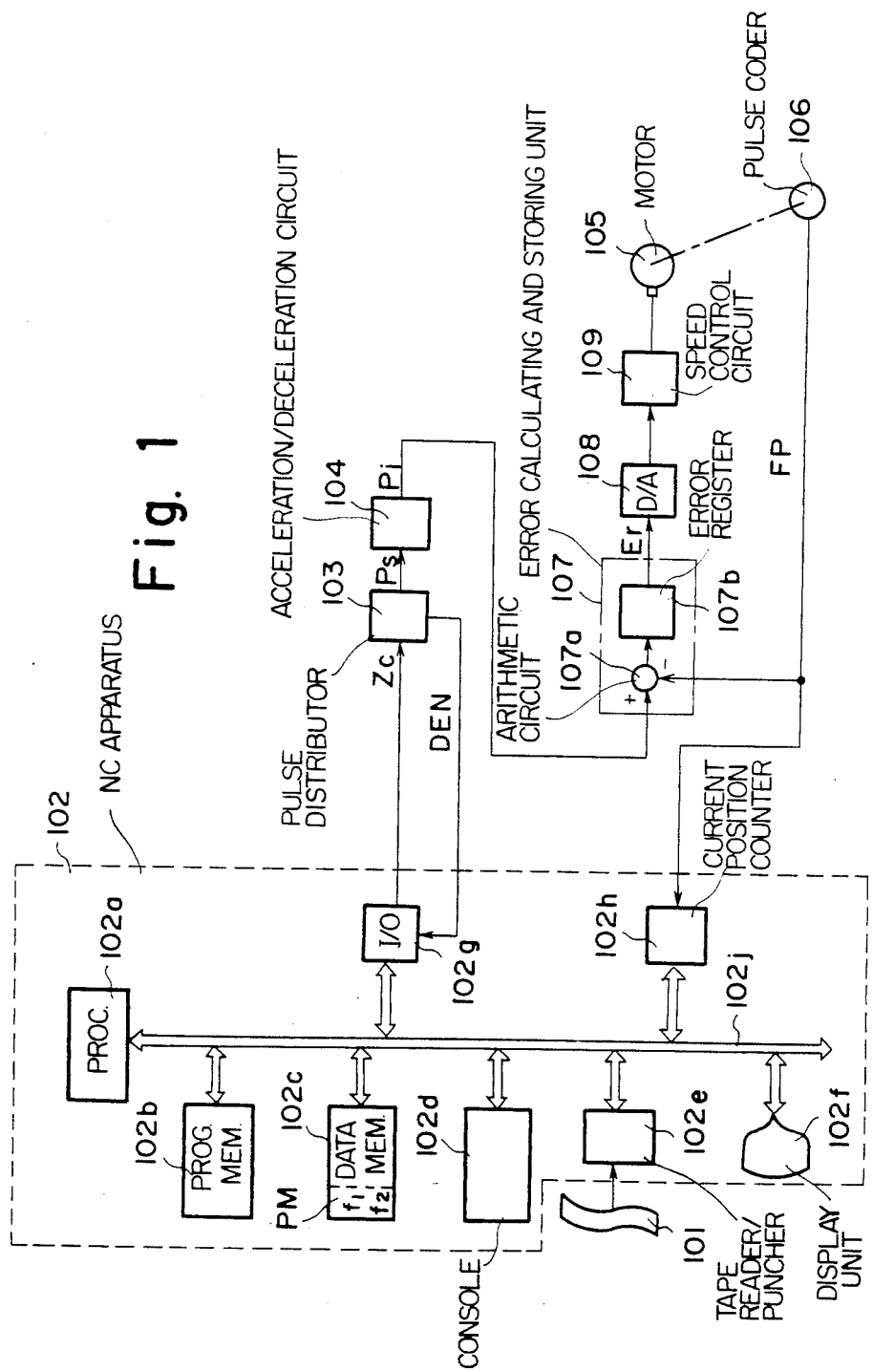
FIG. 1 is a general block diagram of a servocontrol system.
Figure 2:
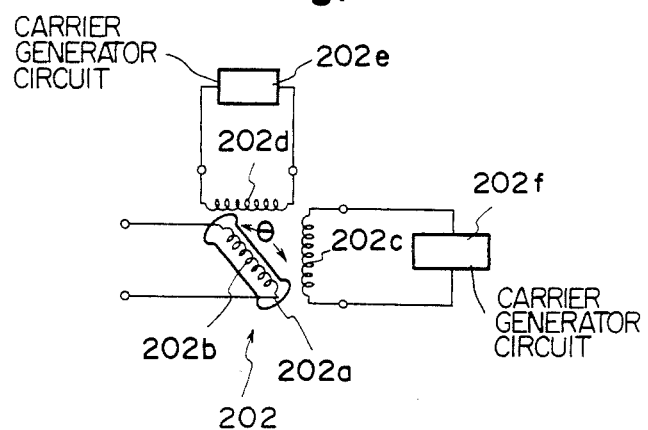
FIG. 2 is a diagram of the arrangement of a resolver employed in the present invention.
Figure 3:
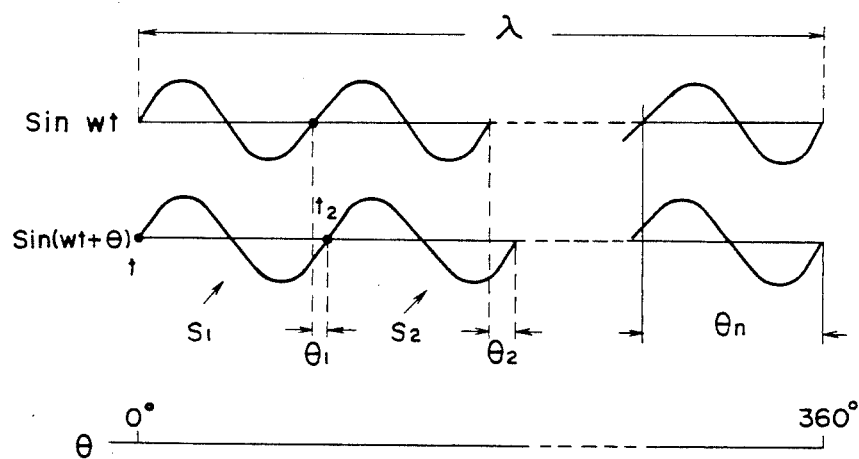
FIG. 3 is a graph for illustrating the operation of the arrangement of FIG. 2.
Figure 4:
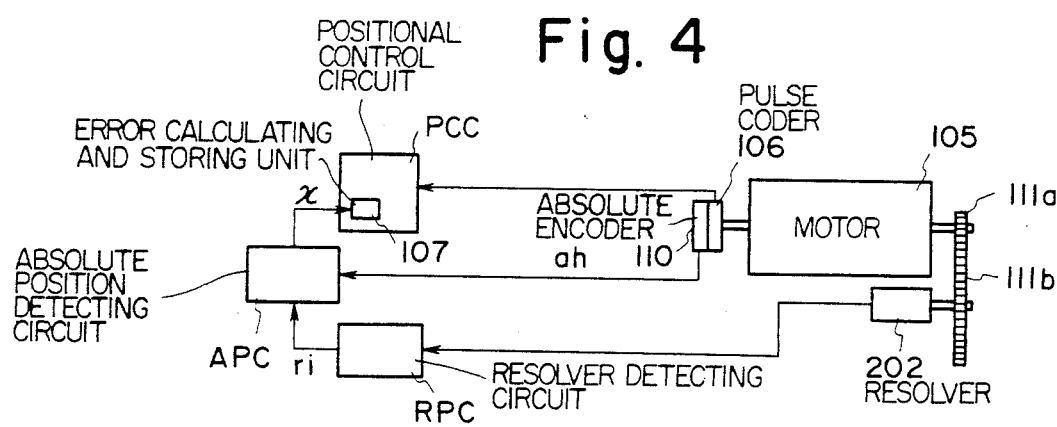
FIG. 4 is a block diagram of an embodiment of the present invention.
Figure 5:
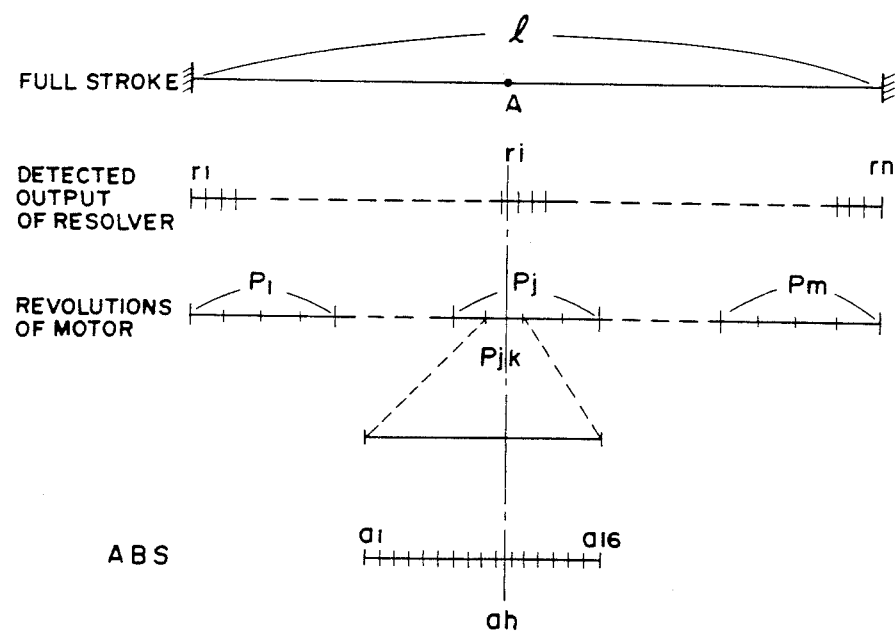
FIG. 5 is a diagram for explaining the operation of the embodiment of FIG. 4.

FIG. 4 is a block diagram of an embodiment of the present invention, and FIG. 5 is a diagram for explaining the operation of this embodiment. Parts identical to those in FIGS. 1 and 2 are denoted by identical reference characters. Denoted at 110 is an absolute encoder which, together with a pulse coder 106, is directly coupled to a rotational shaft of a motor 105. The absolute encoder 110 is composed of a disk bearing on a circumference thereof marks (codes) corresponding to rotational positions and an optical readout means for reading the codes at certain positions. The absolute encoder may be integral with the pulse coder 106. Designated at 111a, 111b are gears mounted on the rotational shafts of the motor 105 and resolver 202, respectively, for transmitting the rotation of the motor 105 to the resolver 202. As illustrated in FIG. 5, the full stroke of a movable portion drivable by rotation of the motor 105 along an operating shaft is indicated by l, while the number of revolutions of the motor 105 is indicated by m (which is not limited to an integer). The gear ratio of the gears 111a, 111b is determined so that the resolver 202 makes one revolution when the motor makes m revolutions. Therefore, the resolver 202 makes one revolution upon movement across the full stroke. Denoted at PCC is a positional control circuit including the error calculating and storing unit 107, the DA converter 108, and the current position counter 102h as shown in FIG. 1. Designated at RPC is a resolver detecting circuit for detecting a phase difference from an output of the resolver 202 and issuing a grid position ri. Denoted at APC is an absolute position detecting circuit for detecting an absolute position A from the grid position ri and an output ah of the absolute encoder 110.

Operation of the apparatus shown in FIG. 4 will be described with reference to FIG. 5.

When the content of the current position counter 102h and the actual current position of the movable portion are out of agreement with each other (when the current position is lost) due to a malfunction of the servo system, the grid position ri is obtained from the resolver detecting circuit RPC based on the output from the resolver 202. More specifically, the detecting circuit RPC determines a mechanical angle α of the resolver 202 from an electrical angle θ of the output from the resolver 202 to calculate the grid position ri. Since the resolver 202 makes one revolution in response to m revolutions (corresponding to the movement across the full stroke l) of the motor 105, the mechanical angle corresponds to the position of a point A. Assuming that the resolver 202 has a resolution n and a number of r.p.m. i, $$ri = i \cdot l/n \quad (2)$$

Although it is said that the resolution n of the resolver 202 is 4000, it has a large error and the actual resolution n is about 1000.

Next, the grid position is converted into a grid position of the absolute encoder 110.

More specifically, the absolute encoder 110 divides the interval of each ¼ revolution of the motor 105 into 16 sections and issues absolute positions $a_1 \sim a_{16}$ corresponding respectively to the divided sections. Therefore, the absolute positions $a_1 \sim a_{16}$ occur four times per revolution of the motor 105. The grid position ri is converted into a grid position Pjk of the absolute encoder 110 at the time the motor 105 makes the ith revolution. This can easily be determined since the resolution n and the number m of r.p.m. of the motor 105 are already known. That is, since n/4m grid positions ri of the resolver 202 correspond to the width of the grid position Pjk of the absolute encoder 110, the ith grid position ri of the resoler 202 corresponds to the (i.4m/n)th grid position Pjk of the absolute encoder 110. The detecting circuit APC thus determines the grid position Pjk in the above manner, and the absolute position of the point A can be determined by reading the detected output ah of the absolute encoder 110 and combining the same with the above grid position.

At this time, the absolute position x of the point A is given by the following equation:

$$x = ik \cdot (l/4m) + ah \cdot (l/4m)16 \qquad (3)$$

Therefore, the resolution becomes 64m as compared with the resolution n of the resolver 202. With n=4000, m=100, the resolution obtained is 1.6 times (=6400/4000) the resolution of the resolver 202. As the actual resolution of the resolver is about n/4, a resolution which is 6.4 times the actual resolution of the resolver is obtained. With the resolution converted into a full stroke, positions can be detected at about 1.5 mm steps.

The absolute position x thus detected is set in the current position counter 102h.

For further increasing the resolution, the absolute position is detected, and thereafter pulses are applied to rotate the motor 105 at a low speed in a fixed direction. The application of the pulses to the motor 105 is stopped when the detected output of the absolute encoder 110 is increased from ah to ah+1. Then, ah+1, instead of ah, is regarded as the absolute position.

With the foregoing absolute position detecting system employed according to the embodiment, the absolute position of the operating shaft with respect to the full stroke can be detected with a high accuracy based on the detected output of the resolver and the detected output of the absolute encoder, and the positional accuracy of the servo system is not impaired.

When an AC motor is used as the servomotor, only the resolver needs to be provided as the absolute encoder is already provided for servocontrol where the servomotor is an AC motor.

According to the present invention, as described above, the resolver and the absolute encoder which rotate with the servomotor are rotated at a certain ratio, and the absolute position of the operating shaft can be detected with a high accuracy from the converted value of the resolver output into the unit grid value of the absolute encoder and the output of the absolute encoder. The present invention is highly effective when employed for operation control of a machine tool or the like under NC.

We claim:

1. An absolute position detecting system for a servocontrol system for controlling, under servocontrol, a servomotor for driving an operating shaft, comprising:
    a resolver, coupled to the servomotor, for detecting a rotational position upon rotation of the servomotor; and
    an absolute encoder, coupled to the servomotor for generating a detected output, said resolver and said absolute encoder being arranged to rotate at a ratio of 1:m, the rotational position detected by said resolver being converted into a unit grid value of said absoute encoder, an absolute position of the operating shaft being detected based on the detected output of said absolute encoder and the converted unit grid value.

2. An absolute position detecting system according to claim 1, wherein the ratio 1:m of revolutions of said resolver to revolutions of said absolute encoder is selected so that m>1.

3. An absolute position detecting system according to claim 1, wherein said resolver generates an output having an electrical angle $\theta$, wherein the unit grid value is calculated by determining a mechanical angle $\alpha$ of said resolver based on the electrical angle $\theta$ of the output of said resolver, and wherein the absolute position is determined based on the detected output of said absolute encoder and the unit grid value.

4. An absolute position detecting system for a servocontrol system for controlling a servomotor, comprising:
    an absolute encoder, coupled to the servomotor, for generating a detected output;
    a resolver, coupled to the servomotor, for detecting a rotational position of the servomotor upon rotation of the servomotor, said resolver and said absolute encoder being arranged to rotate at a ratio of 1:m;
    means for determining a mechanical angle of said resolver based on an electrical angle corresponding to the detected rotational position, and for generating a grid position as an output; and
    means for generating a signal indicating the absolute position of the servomotor based on the detected output of said absolute encoder and the grid position.

* * * * *

UNITED STATES PATENT AND TRADEMARK OFFICE
CERTIFICATE OF CORRECTION

PATENT NO. : 4,575,666

DATED : MARCH 11, 1986

INVENTOR(S) : SEIICHIRO NAKASHIMA ET AL.

It is certified that error appears in the above-identified patent and that said Letters Patent is hereby corrected as shown below:

```
Col. 1, line 47, "trai" should be --train--;
        line 50, "an" should be --.  An--;
        line 64, "pulse" should be--pulses--.

Col. 5, line 4, "resoler" should be --resolver--.

Col. 6, line 16, "absoute" should be --absolute--.
```

Signed and Sealed this

Tenth Day of June 1986

[SEAL]

Attest:

DONALD J. QUIGG

Attesting Officer

Commissioner of Patents and Trademarks